2,957,912
Patented Oct. 25, 1960

2,957,912
PROCESS FOR PREPARING UREA

John A. Patterson, Fishkill, N.Y., assignor to Texaco Inc., a corporation of Delaware No Drawing. Filed Dec. 26, 1958, Ser. No. 783,000

7 Claims. (Cl. 260—555)

This invention relates to a process for preparing urea from carbon monoxide and ammonia using moderate reaction conditions. Urea is useful as a fertilizer and as a reactant for making plastics and resins.

Heretofore it has been proposed to react carbon monoxide and ammonia in a reaction zone in the presence of elemental sulfur to make urea. In order to induce solution of the sulfur in the reaction mixture it is conventional to use some hydrogen sulfide also. Another conventional process calls for the use of carbonyl sulfide instead of elemental sulfur. Still other conventional processes react ammonia with carbon dioxide to make urea.

My process has the advantage of employing as charge stocks all easily handled fluid substances which simplifies the reactor feeding. It also uses milder conditions than the conventional synthesis of urea from ammonia and carbon dioxide, and it does not require the expense of producing an intermediate such as carbonyl sulfide.

Broadly the process comprises contacting ammonia with carbon monoxide at a pressure of at least 200 p.s.i.g. and at a temperature of 160–400° F. in the presence of a liquid reaction vehicle and solid particulate dehydrogenation catalyst. Molecular hydrogen is a coproduct of the process.

Dehydrogenation catalysts useful in my process are particularly the oxides and sulfides of groups VI and VIII metals, frequently in combination with a surface active material such as silica or alumina. Examples of advantageous dehydrogenation catalysts for use in my process are molybdenum sulfide on alumina, molybdena-alumina, and nickel tungsten sulfide.

The catalyst is preferably in a fixed bed, but it can be suspended in the reaction mixture if desired. Reaction time can be from about a minute to about as long as 10 hours or even more; preferably it is between about 10 minutes and 4 hours. In continuous systems reaction time is calculated as an average reaction time, and it is based on the volumetric feed rate of the materials, other than the ones fed in gaseous state, to the reactor and the empty reactor space.

The process is practiced in the presence of an inert or substantially inert liquid vehicle conventional for making urea from carbon monoxide and ammonia, e.g. methanol, ethanol, isopropanol or other lower ($C_1$—$C_8$) alkanol, petroleum ether, benzene, diisopropyl ether, trichloroethylene, aqueous $C_1$—$C_3$ alkanols, ethylene glycol, 2-methoxy ethanol-1, tetrahydrofurfural alcohol, and formamide. It is essentially advantageous that the reaction vehicle be a solvent for urea under reaction conditions to eliminate solids handling problems in the reactor. The preferred reaction vehicles are the lower alkanols, and especially the $C_1$—$C_3$ alkanols.

The liquid vehicle broadly composes from about 40 to about 95 weight percent of the reaction mixture, and preferably it is from about 70 to about 90 weight percent of the mixture. Operation of the process can be batchwise or continuous. Suitable materials of construction for use in my process include corrosion resisting ones such as an austenitic stainless steel.

The pressure of the operation should be at least sufficient to suppress substantial volatilization of the liquid vehicle employed. Generally the pressure in my process will be from 200–2000 p.s.i.g., and preferably it will be between 500 and 1500 p.s.i.g.

Broadly the temperature for the operation is maintained between about 160° and about 400° F. and preferably, for efficiency and economy in the practice of my process, the temperature is between about 200° and 300° F.

While the carbon monoxide reactant can be concentrated, e.g., 90 volume percent or even higher, carbon monoxide gas streams that are comparatively dilute can also be used because my process is substantially insensitive to ill effects from such dilution; (this is not the case when elemental sulfur and solubilizing hydrogen sulfide are used). Thus, in my process the CO stream can contain 0.2–4 volume parts of carbon monoxide per volume part of diluent, e.g. hydrogen, nitrogen, or the like. A suitable CO gas for use in my process can be generated by the combustion of metallurgical coke with air, or by the partial oxidation of a carbon containing substance with oxygen or air to make substantial quantities of hydrogen in connection with the production of the carbon monoxide, i.e. a conventional synthesis gas. The carbon monoxide feed also can contain substantial amounts of carbon dioxide, e.g. as much as 25% by volume or even more as well as carbonyl sulfide, hydrogen sulfide, and associated sulphurous impurities which are frequently present in carbon monoxide-containing streams; these impurities need not be cleansed from the gas. Advantageously, when dilute CO is being used, the pressure of the operation is higher than in a corresponding operation using pure CO, this in order to make the partial pressures of the CO in the reaction correspond.

The comparative insensitivity of my process to these diluents and sulphurous impurities in the CO make it especially economical. In one aspect of my invention hydrogen sulfide is fed deliberately to the operation in a broad mol ratio of ammonia:hydrogen sulfide between about 1:1 and 10:1 or even higher, and most suitably between about 1:1 and 3:1.

In another aspect of my operation part or all of a synthesis gas stream being used to supply hydrogen to an ammonia synthesis process can be run through my urea synthesis as a first step (suitably supplied with ammonia from the ammonia process on the premises). The unreacted carbon monoxide, plus hydrogen originally present and that made in my process, can then, after appropriate treatment to conserve vapors of reaction vehicle and ammonia, be put through a conventional shift conversion reaction with steam to generate carbon dioxide and additional hydrogen from the unreacted CO present, subsequently a carbon dioxide removal step using a caustic alkali solution or an amine, and finally a conventional washing step with liquid nitrogen to prepare a suitable hydrogen-bearing feed for the ammonia synthesis unit.

The mol ratio of ammonia:carbon monoxide used in my process can be between about 10:1 and about 0.1:1 or even lower, and preferably it will be between 0.1:1 and about 0.5:1 for efficiency and economy in the practice of the invention. In the preferred aspect of the invention no hydrogen acceptor substance such as sulfur or the like is charged to the reaction vessel (in this connection it is conceivable that hydrogen sulfide may react to release nascent sulfur under operating conditions and act as a transitory hydrogen acceptor substance).

The following examples show how my process has been practiced but they should not be construed as limiting the invention. All percentages given are weight percentages unless otherwise expressly stated.

*Example 1.*—In this run the catalyst used was nickel tungsten sulfide in the form of black, ¼" diameter by about ¼" high cylindrical pellets. The catalyst had specific surface of 10.4 square meters per gram; it contained 18.3% nickel, 39.1% tungsten, and 23.7% sulfur. The reactor used was a stirred batch pressure vessel made of austenitic stainless steel and having 1535 cc. volume. The reactor was charged with 65 grams of ammonia, 100 grams of catalyst, 300 cc. of methanol, and carbon monoxide gas to maintain the pressure in the reactor at about 500 p.s.i.g. The reactor was kept at 248° F. for 3 hours.

At the end of the run the reactor was cooled, vented to atmosphere, and the product mixture removed. The product mixture was filtered to remove catalyst and the filtrate evaporated, the temperature not being allowed to exceed 185-194° F. In this run 10 grams of solid product analyzing 93.5% urea by weight (9.35 grams of urea) was obtained.

*Example 2.*—In this operation the catalyst used was molybdenum sulfide on alumina in the form of ⁵⁄₁₆" diameter by about ⁵⁄₁₆" high cylindrical pellets having the following characteristics: specific surface of 140 square meters per gram, 12.45% molybdenum, 8.35% sulfur, and crushing strength of 29.3 lbs. The reactor used was the same as that used in Example I. The charge to the reactor was the following: 100 grams of catalyst, 65 grams of ammonia, 53.5 grams of hydrogen sulfide, 600 cc. of methanol, and carbon monoxide gas to maintain the pressure in the reactor at about 700 p.s.i.g. The reactor was kept at 243° F. for 3 hours.

At the end of the run the reactor was cooled, vented to atmosphere, and the product mixture removed therefrom. A sample of the product mixture was taken for ammonia analysis and the remainder filtered to remove catalyst. The vent gas analysis (volume percent) was 61.2 CO, 0.2 $CO_2$, 4.5 $H_2S$, 4.8 $NH_3$, 0.6 N, 24.6 $H_2$, 3.6 $CH_3OH$ vapor, 0.5 air, and a trace of COS. The liquid filtrate was then evaporated, the temperature not being allowed to exceed 185-194° F. Solid product thus obtained was analyzed for urea. In this run 15.7 grams of solid product containing 57.6% by weight urea (9.05 grams of urea) was obtained.

I claim:

1. A process for making urea and molecular hydrogen by contacting ammonia with carbon monoxide in a mol ratio of ammonia:carbon monoxide of between about 10:1 and 0.1:1 at a pressure between 200-2000 p.s.i.g. and at a temperature of between about 160° F. to 400° F. in the presence of inert liquid reaction vehicle, said vehicle comprising between about 40 and 95 wt. percent of the reaction mixture, and a solid particulate dehydrogenation catalyst selected from the group consisting of molybdenum sulfide on alumina, molybdena-alumina and nickel tungsten sulfide.

2. The process of claim 1 wherein the catalyst is molybdena-alumina.

3. The process of claim 1 wherein the catalyst employed is nickel tungsten sulfide.

4. The process of claim 1 wherein the catalyst is molybdenum sulfide on alumina base.

5. The process of claim 1 wherein hydrogen sulfide is charged to the process in a mol ratio of said ammonia to hydrogen sulfide between about 1:1 and 10:1.

6. The process of claim 1 wherein the carbon monoxide is dilute.

7. The process of claim 1 wherein the reaction vehicle is lower alkanol.

References Cited in the file of this patent

UNITED STATES PATENTS

| | | |
|---|---|---|
| 1,425,578 | Clancy | Aug. 15, 1922 |
| 2,601,221 | Rosenblatt et al. | June 17, 1952 |
| 2,620,356 | Munday | Dec. 2, 1952 |
| 2,716,135 | Winstrom | Aug. 23, 1955 |
| 2,857,430 | Applegath et al. | Oct. 21, 1958 |